United States Patent [19]

Bowden, III et al.

[11] Patent Number: 4,964,130
[45] Date of Patent: Oct. 16, 1990

[54] SYSTEM FOR DETERMINING STATUS OF ERRORS IN A MEMORY SUBSYSTEM

[75] Inventors: Raymond D. Bowden, III, Tewksbury; Edward R. Salas, Lowell; Marc E. Sanfacon, Acton; Jeffrey S. Somers, Lowell, all of Mass.

[73] Assignee: Bull HN Information Systems Inc., Billerica, Mass.

[21] Appl. No.: 287,928

[22] Filed: Dec. 21, 1988

[51] Int. Cl.⁵ ............................................. G06F 11/10
[52] U.S. Cl. ................................ 371/40.2; 371/21.6; 371/21.2; 371/5.1
[58] Field of Search .................. 371/21.6, 21.2, 21.1, 371/13, 40.2, 40.3, 29.1, 5.1, 5.5; 365/201, 200

[56] References Cited

U.S. PATENT DOCUMENTS

| | | | |
|---|---|---|---|
| 3,814,922 | 6/1974 | Nibby | 371/21.6 |
| 3,999,051 | 12/1976 | Petschauer | 371/21.6 X |
| 4,255,808 | 3/1981 | Schaber | 371/21.6 X |
| 4,371,930 | 2/1983 | Kim | 364/200 |
| 4,375,664 | 3/1983 | Kim | 364/200 |
| 4,456,995 | 6/1984 | Ryan | 371/21.6 |
| 4,479,214 | 10/1984 | Ryan | 371/21.6 X |
| 4,506,362 | 3/1985 | Morley | 371/13 |
| 4,523,313 | 6/1985 | Nibby, Jr. et al. | 371/10 |
| 4,527,251 | 7/1985 | Nibby, Jr. et al. | 364/900 |
| 4,535,455 | 8/1985 | Peterson | 371/13 |
| 4,570,217 | 2/1986 | Allen et al. | 364/188 |
| 4,604,751 | 8/1986 | Aichelmann | 371/21.6 |
| 4,712,216 | 12/1987 | Glaise | 371/13 |
| 4,809,276 | 2/1989 | Lemay et al. | 371/38 |

OTHER PUBLICATIONS

F. Aichelmann, "Syndromes for Error Location Mapping of Memory Arrays", IBM TDB, vol. 26, No. 6, 11/1983, pp. 2749–2750.

Primary Examiner—Jerry Smith
Assistant Examiner—Robert W. Beausoliel
Attorney, Agent, or Firm—Gary D. Clapp; John S. Solakian

[57] ABSTRACT

A system and method for detecting an error that occurred in a multi-chip memory storage device in a data processing system. The system detects an error and receives data and check bits associated therewith. A process that uses the principle of scrubbing and incorporates high speed error flags distinguishes between hard and soft errors.

12 Claims, 12 Drawing Sheets

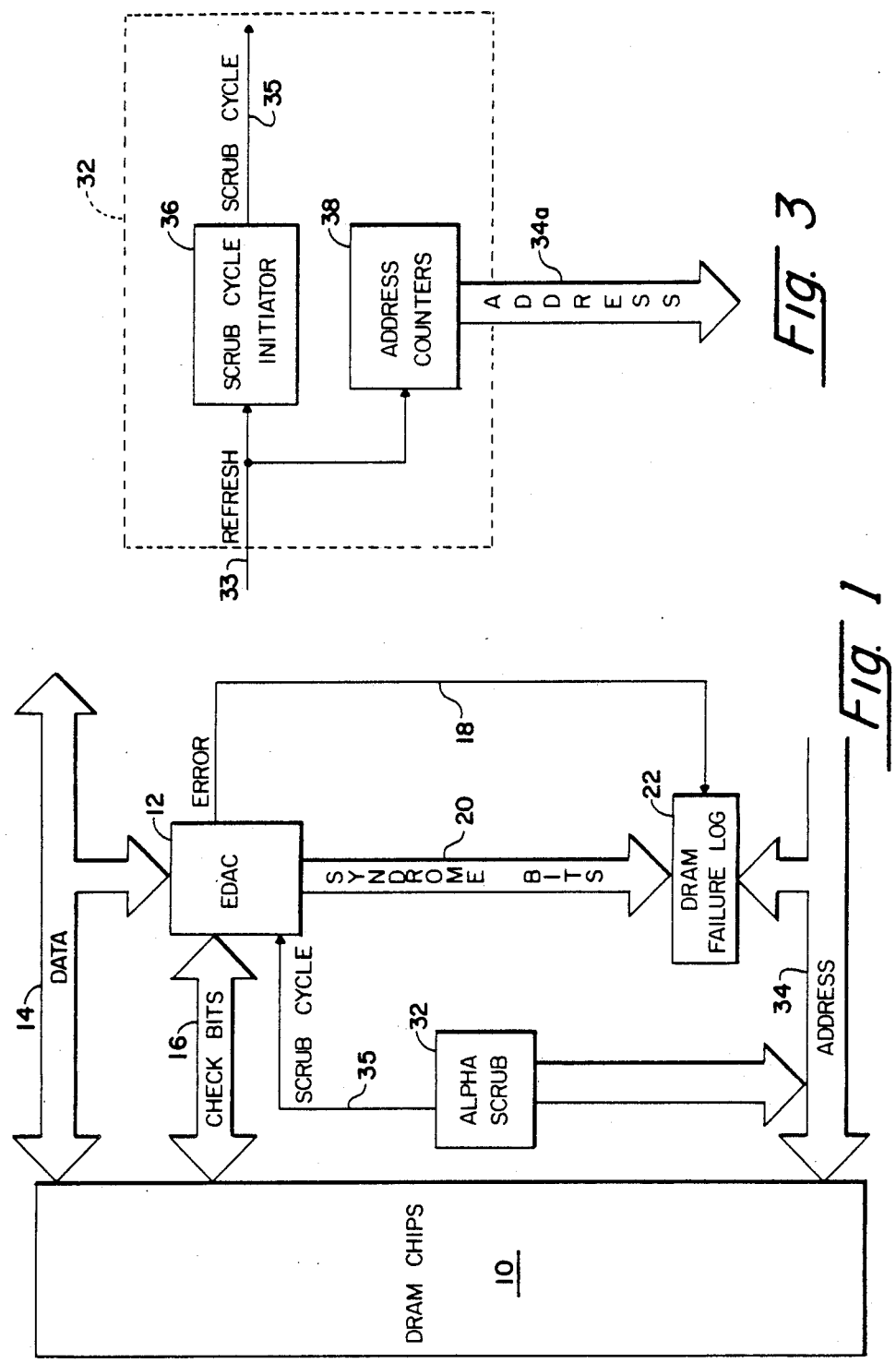

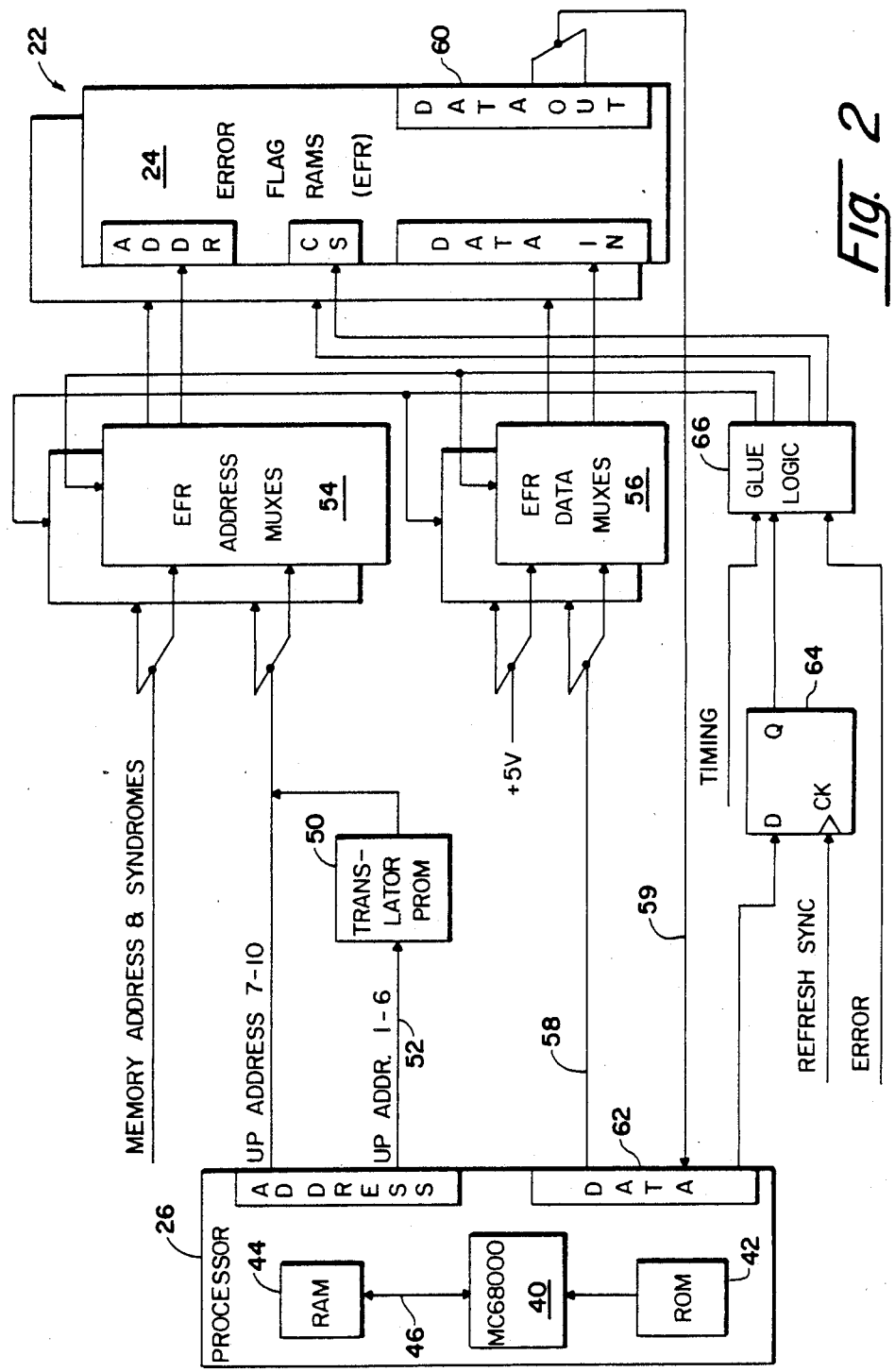

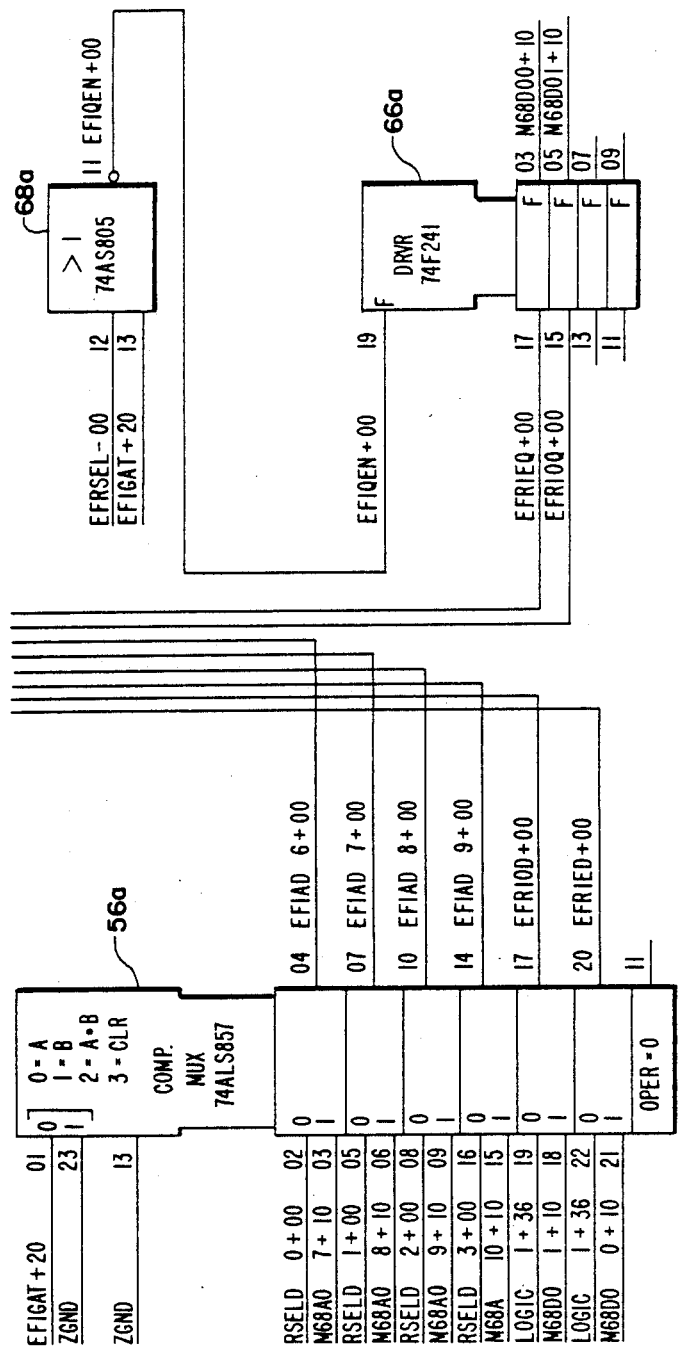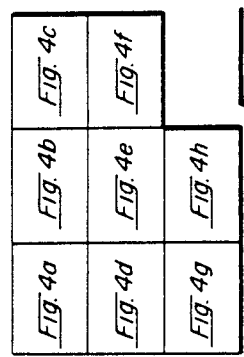

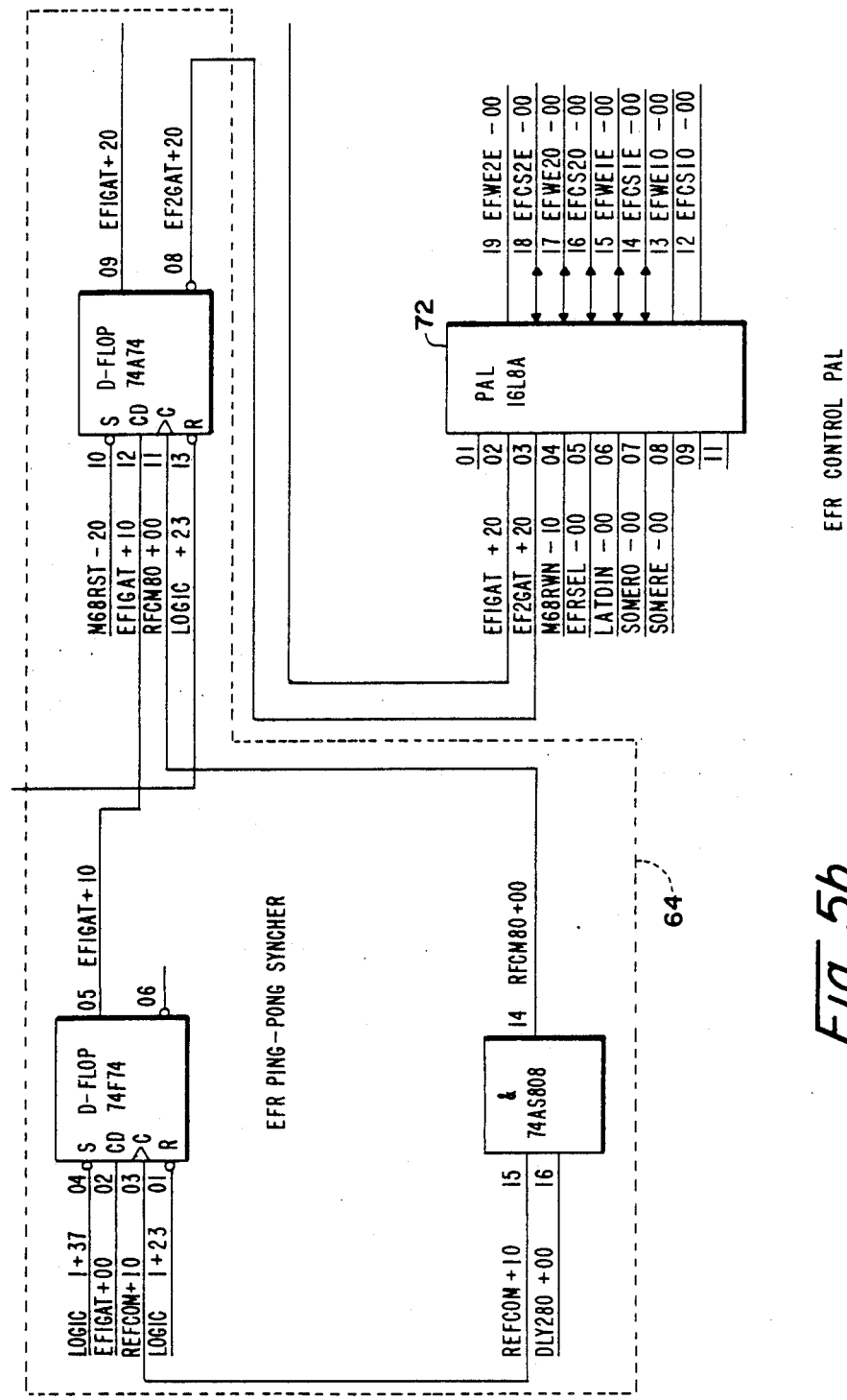

SYSTEM FOR DETERMINING STATUS OF ERRORS IN A MEMORY SUBSYSTEM

RELATED PATENT APPLICATION

The patent application of Raymond D. Bowden, III, Edward R. Salas, Marc E. Sanfacon and Jeffrey S. Somers entitled, "Memory Controller with Error Logging," Ser. No. 07/287,927, filed on Dec. 21, 1988, which is assigned to the same assignee as this patent application.

BACKGROUND OF THE INVENTION

The present invention relates to a method and system for detecting errors in a memory subsystem and, more particularly, to a system for determining whether such detected errors are hard or soft errors.

In any digital system where data is stored, transmitted or received, one or more of the data bytes may be received and stored in error. In fact, a data value may even be corrupted spontaneously due to impingement of the memory device by alpha particles or due to other random, unpredictable events. This has been a problem from the time data processing systems were first invented.

As more sophisticated data processing operations are performed, involving more complex equipment, there is a greater need for systems to detect and correct stored errors. For example, operations such as merging files, sorting of data within files, numerical/statistical analyses, complex data handling procedures and word processing operations require increased reliability in data transfer and storage. If data errors occur and are undetected, valuable information and system operation itself may be affected. Thus, error detecting and correcting features are not only advantageous, they are required to improve system integrity.

In response to the problem of error generation, systems have been developed to detect such errors. One of the earliest methods for detecting errors was the parity check code. A binary code word has odd parity if an odd number of its digits are 1's. For example, the number 1011 has three 1 digits and therefore has odd parity. Similarly, the binary code word 1100 has an even number of 1 digits and therefore has even parity.

A single parity check code is characterized by an additional check bit added to each data word to generate either odd or even parity. An error in a single digit or bit in a data word would be discernible since the parity check bit associated with that data word would then be reversed from what is expected. Typically, a parity generator adds the parity check bit to each word before transmission. This technique is called padding the data word. At the data requesting device or receiver, the digits in the word are tested and if the parity is incorrect, one of the bits in the data word is considered to be in error. When an error is detected at a receiver, a request for a repeat transmission can be given to memory so that the error can be corrected. Only errors in an odd number of digits can be detected with a single parity check, since an even number of errors results in the parity expected for a correct transmission. Moreover, the specific bit in error cannot be identified by the parity check procedure as hereinabove described.

A more sophisticated error detection system was later devised. Data words of a fixed length of bits were grouped into blocks of a fixed number of data words each. Parity checks were then performed between different data words as well as for each individual data word. The block parity code detected many patterns of errors and could be used not only for error detection, but also for error correction when an isolated error occurred in a given row and column of the matrix. While these geometric codes were an improvement over parity check bits per se, they still could not be used to detect errors that were even in number and symmetrical in two dimensions.

After parity check codes and geometric codes were devised, a code was invented by R. W. Hamming, after whom it is named. The Hamming code is a system of multiple parity checks that encodes data words in a logical manner so that single errors can be not only detected but also identified for correction. A transmitted data word used in the Hamming code consists of the original data word and parity check digits appended thereto. Each of the required parity checks is performed upon specific bit positions of the transmitted word. The system enables the isolation of an erroneous digit, whether it is in one of the original data word bits or in one of the added parity check bits.

If all the parity check operations are performed successfully, the data word is assumed to be error free. If one or more of the check operations is unsuccessful, however, the single bit in error is uniquely determined by decoding so-called syndrome bits, which are derived from the parity check bits. It should be noted once again that only single bit errors are detected and corrected by use of the conventional Hamming code. Double bit errors, although detectable by the Hamming code, are not correctable.

The Hamming code is only one of a number of codes, generically called error correcting codes (ECC's). Codes are usually described in mathematics as closed sets of values that comprise all the allowed number sequences in the code. In data communications and processing, transmitted or transferred numbers are essentially random data patterns which are not related to any predetermined code set. The sequence of data, then, is forced into compliance with the code set by adding to it at the transmitter, as hereinabove mentioned. A scheme has heretofore been developed to determine what precise extra string to append to the original data stream to make the concatenation of transmitted data a valid code. There is a consistent way of extracting the original data from the code value at the receiver and to deliver the actual data to the location where it is ultimately used. For the code scheme to be effective, it must contain allowed values sufficiently different from one another so that expected errors do not alter an allowed value such that it becomes a different allowed value of the code.

A cyclic redundancy code (CRC) consists of string of binary data evenly divisible by a generator polynomial, which is a selected number that results in a code set of values different enough from one another to achieve a low probability of an undetected error. To determine what to append to the string of original data, the original string is divided as it is being transmitted. When the last data bit is passed, the remainder from the division is the required string that is added since the string including the remainder is evenly divisible by the generator polynomial. Because the generator polynomial is of a known length, the remainder added to the original string is also of fixed length.

At the receiver, the incoming string is divided by the generator polynomial. If the incoming string does not divide without remainder, an error is assumed to have occurred. If the incoming string is divided by the generator polynomial without remainder, the data delivered to the ultimate destination is the incoming data with the fixed length remainder field removed.

A so-called "soft" error (i.e., one that is correctable) could be the result of an alpha particle destroying the charge on a memory cell. This is known as a soft error because the data can be rewritten and the cell can perform properly again. A soft error is correctable via an Error Detection and Correction (EDAC) chip.

If the error is a result of a memory cell stuck at logic one or zero, the memory cell can no longer function properly and should be removed. This is known as a "hard" or uncorrectable error.

Both types of errors are symptomatic of potential memory cell degradation in DRAMs. Distinguishing between soft and hard errors is helpful in determining the effects of system operation.

The probability of at least one error occurring during a predetermined time interval increases in direct proportion to the number of such memory devices or size of overall memory. Thus, larger, more complex computer systems are especially susceptible to soft errors due to random anomalies and are therefore also susceptible to defectively stored data.

U.S. Pat. Nos. 4,371,930 and 4,375,664 both issued to Kim, teach the use of error detection, correction and selective logging apparatus for single bit memory errors. Only single bit errors which the system determines most likely to be solid (hardware-related) errors are logged. The solid error situation occurs when two single bit errors have consecutive memory addresses.

U.S. Pat. Nos. 4,523,313 and 4,527,251, both issued to Chester M. Nibby, Jr., et al, teach the use of partially good memory devices in a semiconductor memory system. The defective portions of memory devices in the aforementioned references, however, are hard, uncorrectable portions, while the good portions are consistently reliable and identified as such before they are incorporated into the computer system. Identifying errors that may be correctable (soft errors) is beyond the scope of these references.

U.S. Pat. No. 4,535,455 issued to Peterson teaches a system for correcting and logging transient errors that occurred in a block of memory locations in a memory device. A microprocessor under the control of a program accesses and reaccesses each memory location, rewrites each word of readout information, again reads each word, and finally logs only transient errors in an error rate table.

It would be advantageous to detect errors.

It would also be advantageous to log errors for future analysis.

It would also be advantageous to provide a method for determining whether a detected error is a hard or a soft error.

It would also be advantageous to provide an indicator for detected errors.

SUMMARY OF THE INVENTION

In accordance with the present invention, there is provided a system and method for detecting an error that occurred in a multi-chip memory storage device in a data processing system. The system detects an error and receives data and check bits associated therewith. A process that uses the principle of scrubbing and incorporates high speed error flags distinguishes between hard and soft errors.

BRIEF DESCRIPTION OF THE DRAWINGS

A complete understanding of the present invention may be obtained by reference to the accompanying drawings, when taken in conjunction with the detailed description thereof and in which:

FIG. 1 is a block diagram of the memory controller of the present invention;

FIG. 2 is a block diagram of the error logging subsystem in greater detail;

FIG. 3 is a block diagram of the scrubbing mechanism in greater detail;

FIGS. 4a–4f and 4g–4h taken together represent a schematic diagram of error flag RAMs and associated circuitry for use in the error logging subsystem.

DESCRIPTION OF THE PREFERRED EMBODIMENT

Figure 4A:
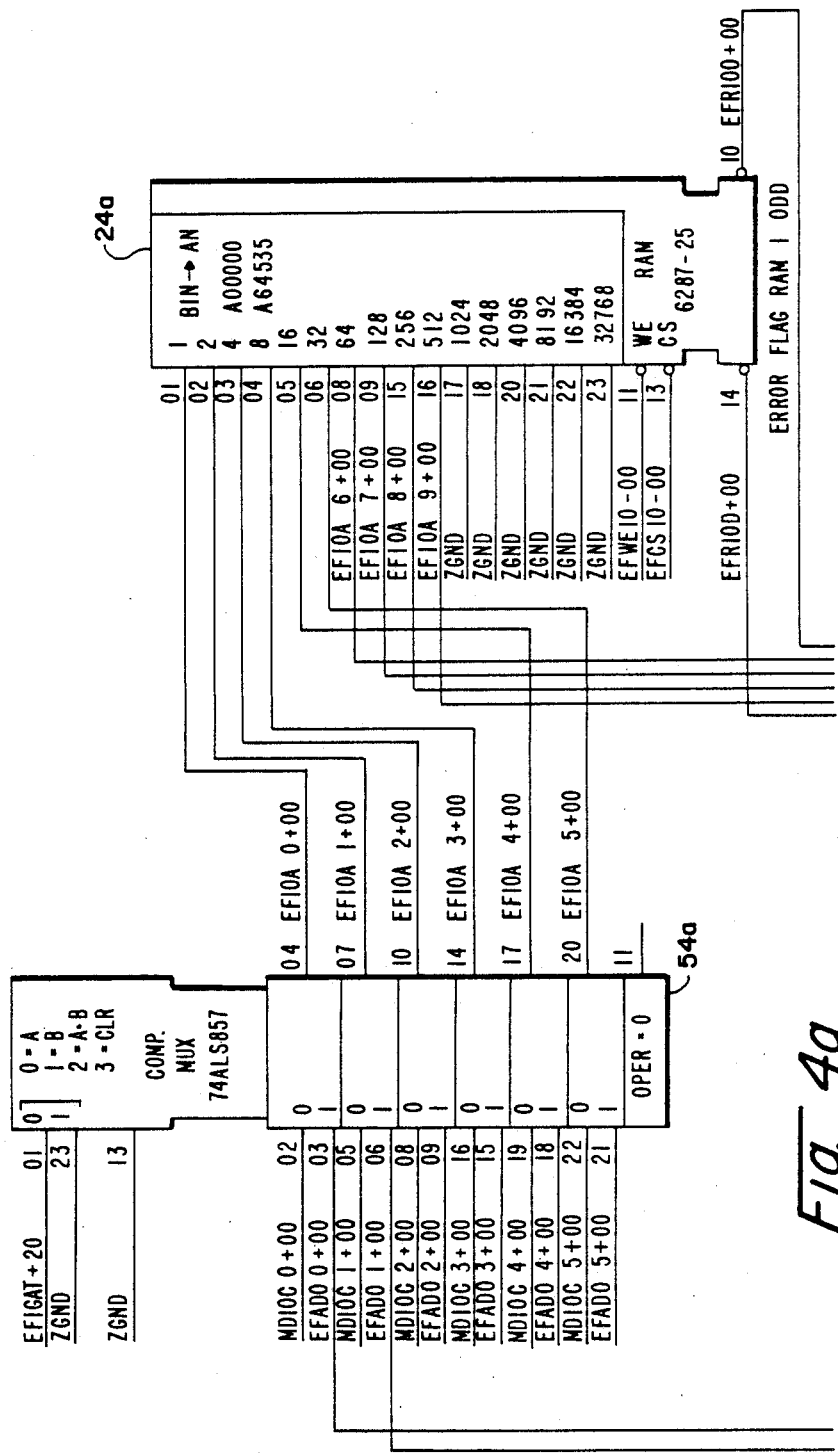

Referring now to FIG. 1, there is shown the memory controller of the present invention. A bank or matrix of DRAM chips 10 contains a plurality of 1 megabit memory storage chips. It should be understood that any number of DRAM chips of any suitable capacity and any suitable configuration can be used in this multi-chip memory subsection. In the preferred embodiment, 704 DRAM chips are divided into four memory pacs, each containing 176 chips. Connected to DRAM chips 10 is error detection and correction (EDAC) logic 12, such as is available on an IC chip from Advanced Micro Devices, Inc. as Model No. Am2960.

EDAC 12 is connected to DRAM chips 10 by means of a 16-bit parallel data bus 14. Also connecting EDAC 12 to DRAM chips 10 is a 6-bit parallel bus 16 for transferring check bits between EDAC 12 and DRAM chips 10. The check bits, not shown, are generated by EDAC 12 during write operations to DRAM chips 10. Check bits are read back and decoded during read operations from DRAM chips 10. EDAC 12 can generate a 2-bit error signal, when required, over a line 18 connected thereto and provided expressly for that purpose.

EDAC 12 also generates syndrome bits over a 6-bit parallel syndrome bit bus 20. Syndrome bits are generated in the course of error processing, as mentioned hereinabove.

Connected to syndrome bit bus 20 and to error line 18 is a DRAM error or failure log device 22. Failure log 22 includes a bank of error flag RAMs (EFRs), not shown in this FIGURE, but discussed in greater detail hereinbelow, and a microprocessor, not shown.

An address bus 34 is connected to DRAM chips 10 and to DRAM failure log 22. Also connected to address bus 34 by means of an extension bus 34a is an alpha particle scrub device 32, used to scrub (read data, correct if necessary, then write to) memory locations in DRAM chips 10. Alpha scrub device 32 initiates a scrub cycle over a line 35, which is connected between alpha scrub device 32 and EDAC 12. Alpha scrub device 32 generates an effective 26 bit address over address bus 34, which address is applied to failure log 22.

Referring now also to FIG. 2, there is shown a block diagram of the DRAM failure log device 22 (FIG. 1) in greater detail. A processor 26 is provided with a microprocessor 40, such as is available from Motorola as Model No. MC68000. Microprocessor 40 handles power up initialization and testing, diagnostic testing, and error logging. Connected to microprocessor 40 is a ROM 42 that contains instructions for microprocessor 40. Random access memory 44 is connected by means of a bidirectional line 46 to microprocessor 40.

A translator PROM 50, the function of which is described in greater detail below, is connected to processor 26 by means of a 6-bit parallel address bus 52. The output of translator PROM 50 is applied to error flag RAMs (EFRs) address multiplexers 54. The outputs of EFR multiplexers 54, in turn, are applied to EFRs 24. EFR data multiplexers 56 are connected to the data output ports 62 of processor 26 over line 58.

Data is read from EFRs 24 by means of data output ports 60 and applied to data ports 62 of processor 26 over line 59, provided for that function.

A flip-flop device 64 is connected to EFR address and EFR data multiplexers 54 and 56, respectively, for allowing one of the multiplexers (e.g., data 56) to receive data while the other (e.g., address 54) is being unloaded.

So called "glue logic" 66 is provided to reformat signals generated by flip-flop 64, EDAC 12 and microprocessor 40 into protocol suitable for address and data multiplexers 54 and 56 and EFR 24.

Referring now also to FIG. 3, there is shown a block diagram of alpha scrub device 32 (FIG. 1) in greater detail. A REFRESH signal is generated over REFRESH line 33 and applied to a scrub cycle initiator 36, which generates a SCRUB CYCLE instruction over line 35. The REFRESH signal is also applied to address counters 38, which generate signals that are transferred to address bus 34a.

In the technique known as alpha-scrubbing, every 0.96 msec one memory location in DRAM 10 (FIG. 1) is read by the alpha scrub circuitry. If an error is found, EDAC 12 corrects it and the corrected data is written back into memory 10. Therefore, every memory location on a controller with a capacity of 256 Megabytes is scrubbed every 17.9 hours. Furthermore, one memory row of DRAM chips 10 is scrubbed every 67.11 minutes. The monitoring function of the present invention can determine at the soonest possible moment when a given DRAM 10 has been scrubbed. For each error, 6 syndrome bits and 4 memory row selects are generated which identify to the DRAM or row of DRAMs where the error occurred. These bits are used to record each hard and soft error in EFR 24 (FIG. 2). Monitoring processor 26 periodically interrogates EFRs 24 and records the errors in failure log 22.

As mentioned previously, EDAC 12 generates syndrome bits 20 which are fed into failure log 22. These syndrome bits 20 are encoded by EDAC 12 such that the data bit 14 in error on a single bit error can be determined by processor 26 with the use of a lookup table stored in processor's ROM 42. Additionally, the four row selects contained in address bus 34 are used to complete the error isolation to one of 704 DRAM chips 10.

In the case of multiple bit errors, syndrome bits 20 cannot isolate which data bits 14 are in error. The only isolation that can be accomplished is the determination of the DRAM chip row in which the error occurred. This determination can be made from the four row selects contained in address bus 34.

Processor 26 transfers the contents of failure log 22 to the system bus, not shown, using a handshake scheme.

The transferred failure log 22 can contain up to 704 single bit errors and up to 32 double bit errors. Each single bit error corresponds to a single DRAM chip 10 and each double bit error corresponds to 22 DRAM chips.

A scrub error occurs when:
(1) an error is detected in the given DRAM 10,
(2) the DRAM is subsequently scrubbed, and
(3) another error is subsequently detected in the given DRAM 10.

Scrub error detection is used to distinguish between a DRAM which experiences a one time error and a DRAM which experiences recurring soft errors or hard errors. In essence, this technique eliminates counting multiple detections of a soft error before the DRAM has been scrubbed.

Referring now also to FIGS. 4a–4f, there is shown a schematic diagram of error flag RAMs (EFRs) 24 (FIG. 2) and associated circuitry for rendering them operational.

Figure 4B:
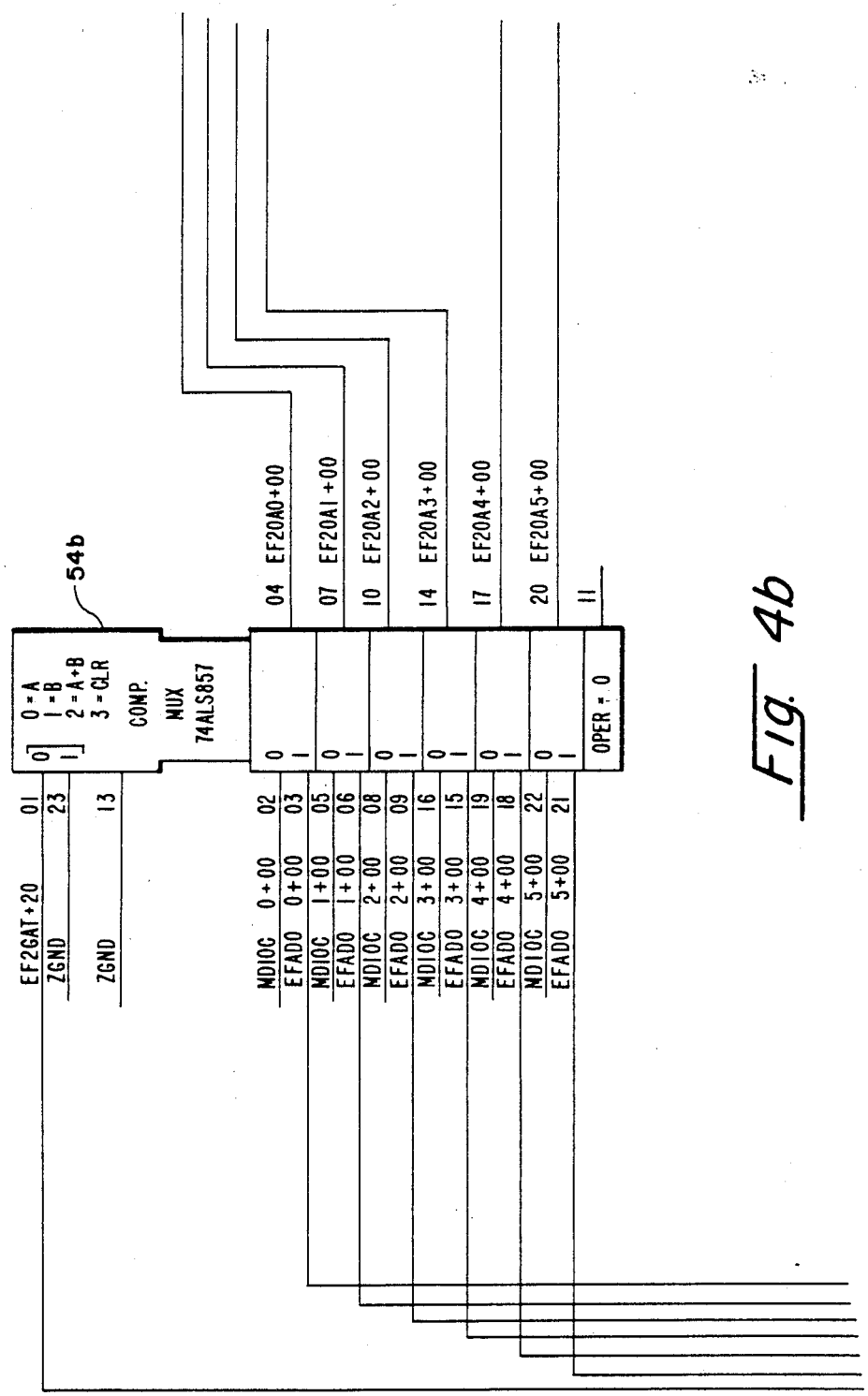
Figure 4C:
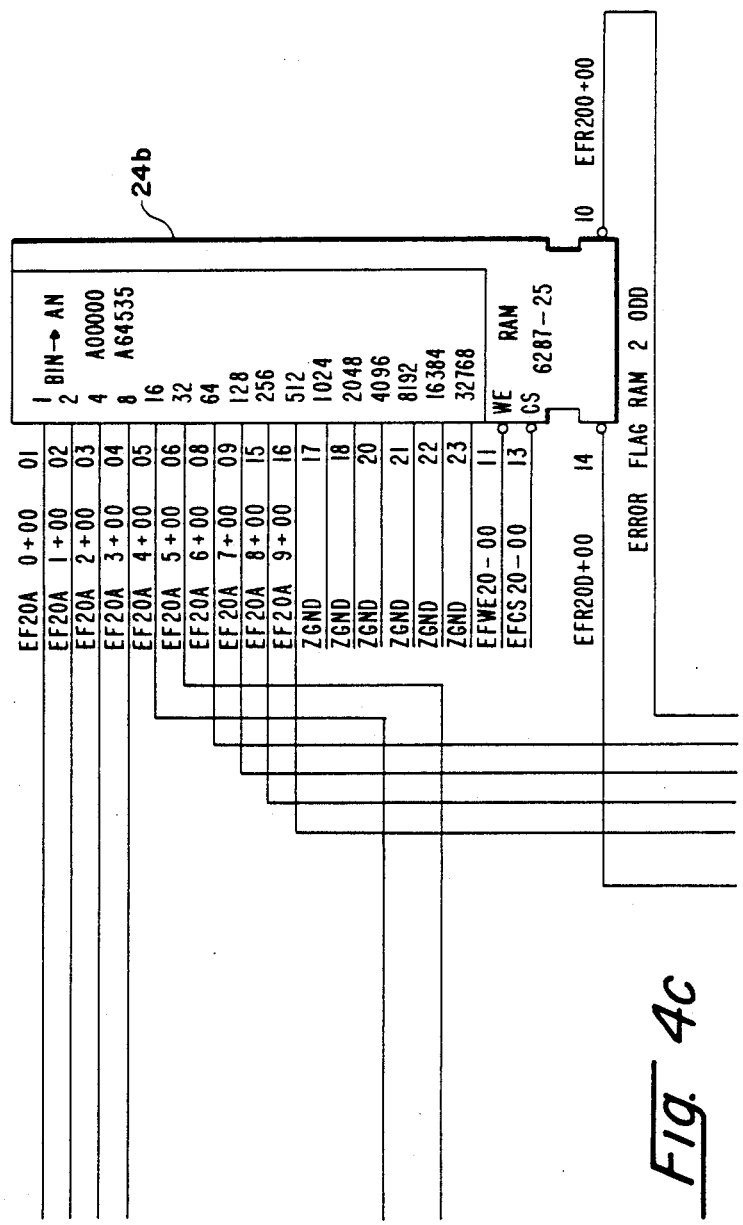
Figure 4D:
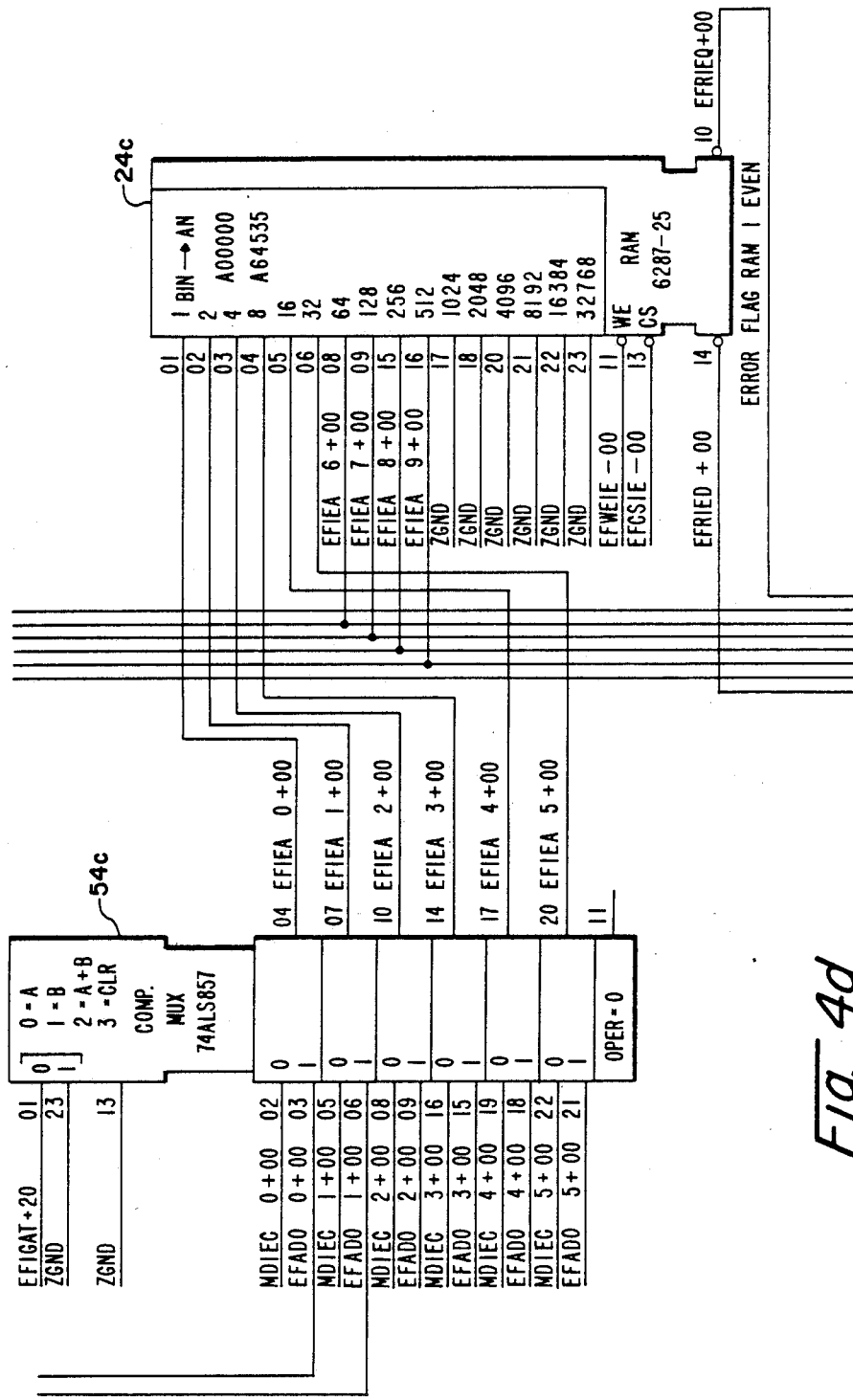
Figure 4E:
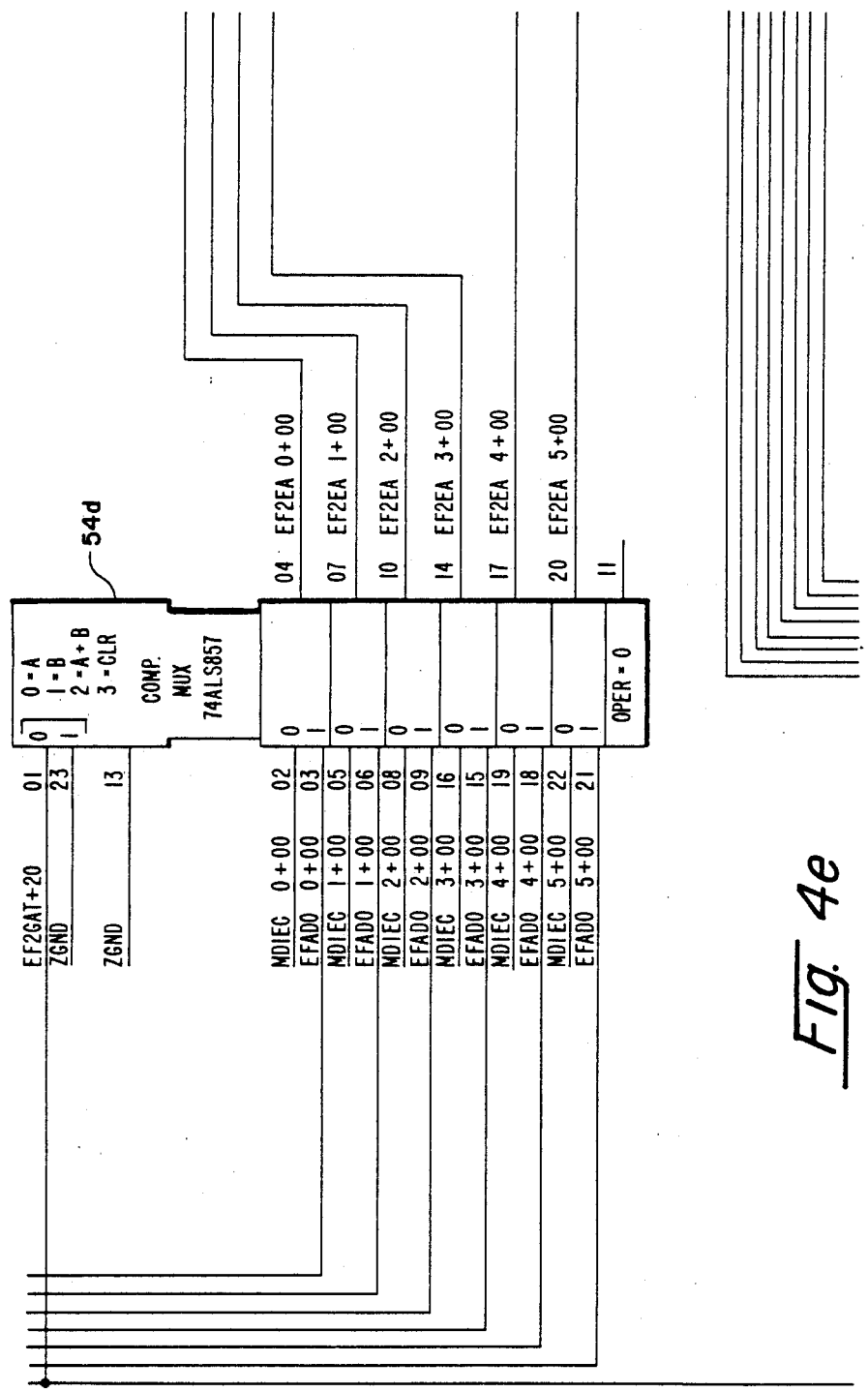
Figure 4F:
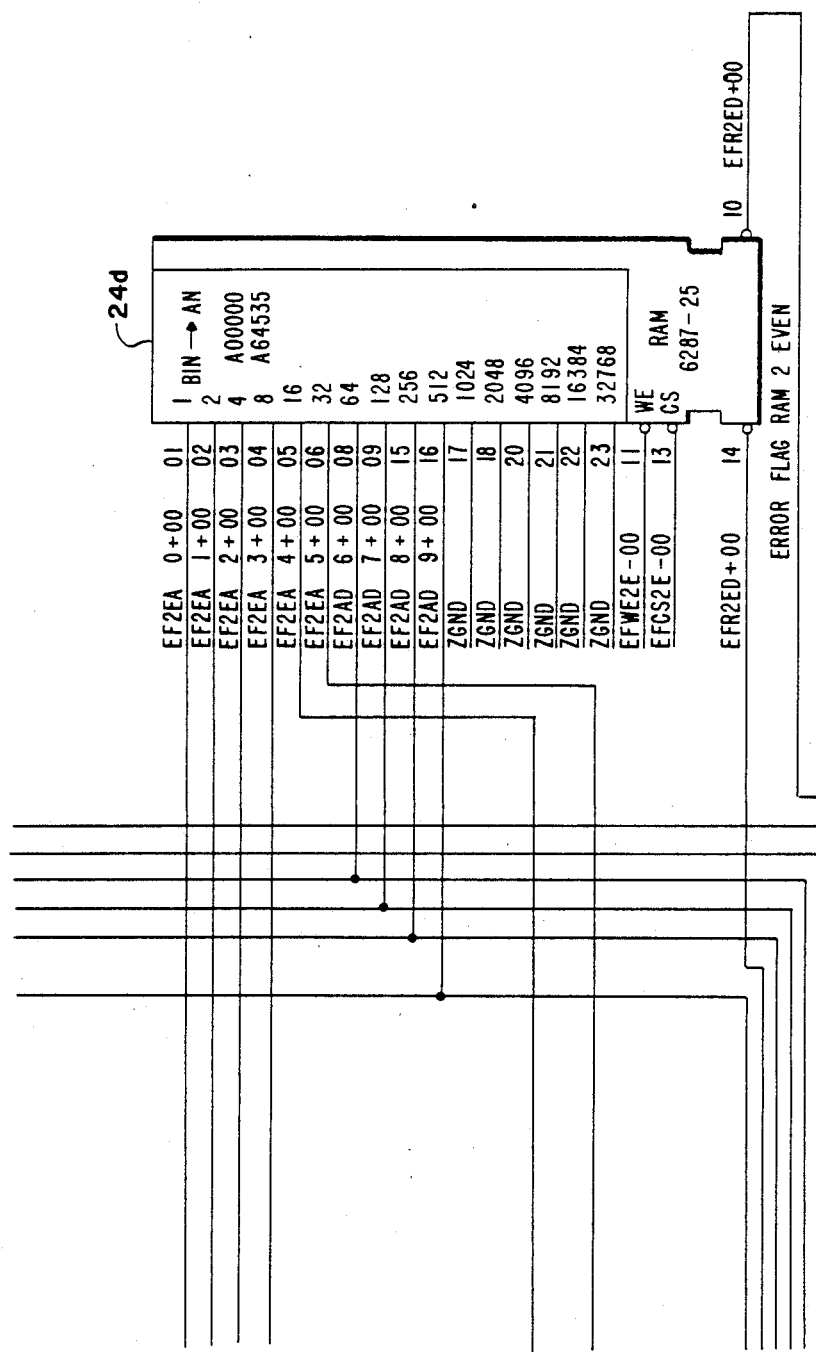
Figure 4H:
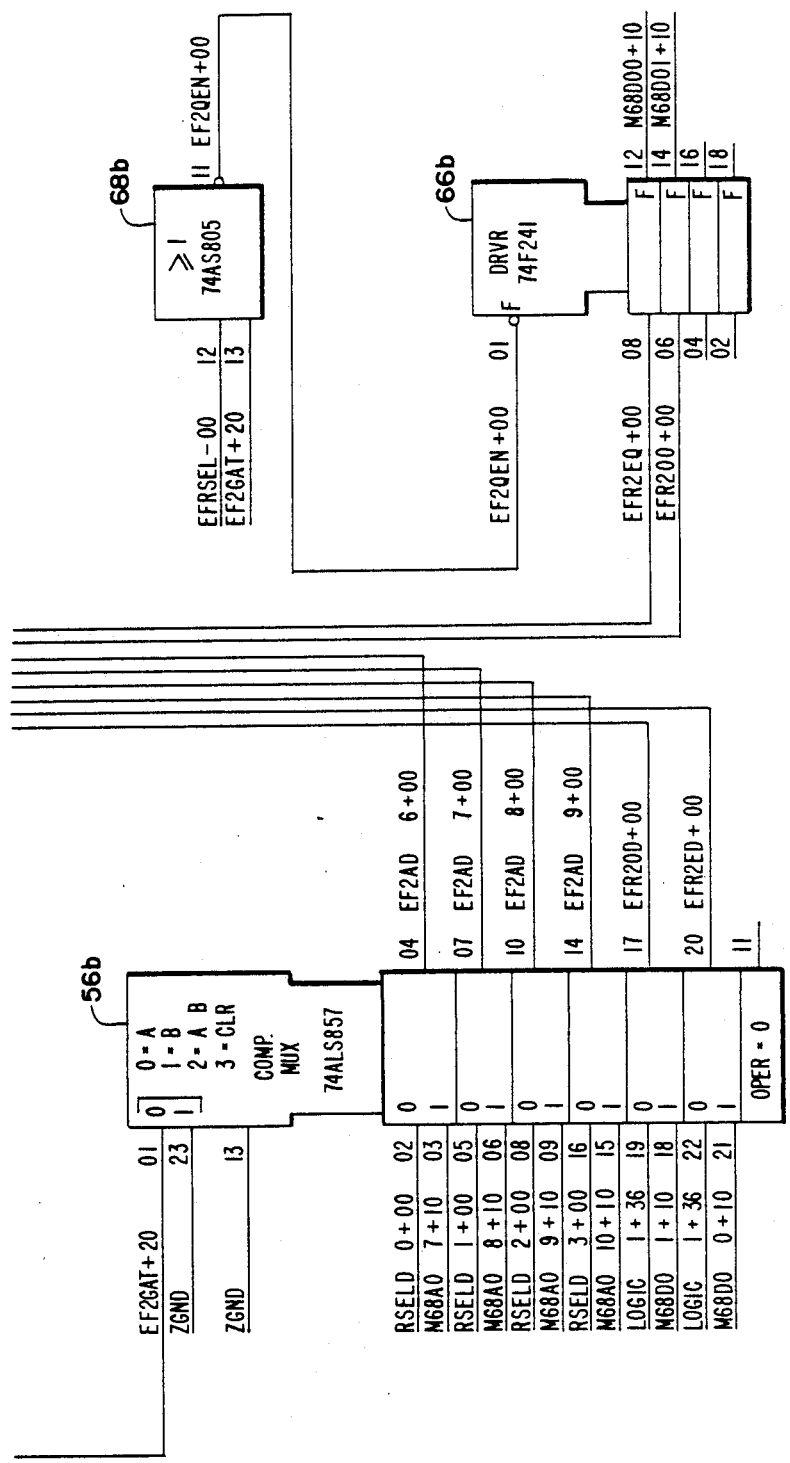

FIGS. 4a–4c and 4d–4g are very similar. FIGS. 4a–4c show the connection of address multiplexers 54a and 54b and data multiplexer 56a (which includes certain address bits) to EFRs 24 for first EFR odd and even sections, 24a and 24b, respectively. Similarly, FIGS. 4d–4f show multiplexers 54c, 54d and 56b for second EFR odd and even sections 24c and 24d, respectively.

Address multiplexers 54a and 54b are connected to EFRs 24a and 24b as shown in the FIGURE. EFR data multiplexer 56a is connected to first portion error flag RAMs 24a and 24b.

Connected to the data outputs of EFRs 24a and 24b is a tri-state driver 66a. Also connected to driver 66a is the output of a NOR gate 68a.

The major distinction between the two sets of FIGS. 4a–4c and FIGS. 4d–4f, besides relating to the first EFRs section 24a, 24b and the second EFRs section 24c, 24d, is that NOR gate 68a is replaced in FIGS. 4d–4f by an OR gate 68b. Accordingly, for the sake of simplicity only the operation of FIGS. 4a–4c is discussed herein since the subsystem shown in FIGS. 4d–4f and the operation thereof is a mirror image of that shown in FIGS. 4a–4c.

Another distinction between operation of the subsystem shown in FIGS. 4a–4c and that shown in FIGS. 4d–4f is that the control signals applied to the Write Enable (WE) and Chip Select (CS) ports of EFRs 24a and 24b differ from those applied to ports of EFRs 24c and 24d and are distinguished by unique signal nomenclature. In FIGS. 4a–4c, signals input to WE and CS of EFR 24a are EFWE1O-00 and EFCS1O-00, respectively, as opposed to corresponding input signals for EFR 24c (FIGS. 4d–4f) which are, respectively, EFWE2O-00 and EFCS2O-00 (emphasis added). Similarly, signals input to EFR 24b (FIGS. 4a–4c) are EFWE1E-00 and EFCS1E-00, respectively, as opposed to corresponding signals input to EFR 24d (FIGS. 4d–4f), which are EFWE2E-00 and EFCS2E-00.

The Select inputs of multiplexers 54a, 54b, 56a and of multiplexers 54c, 54d, 56b are individually addressed by flip-flop 64 (FIG. 2).

Figures 5, 5A, 5B:
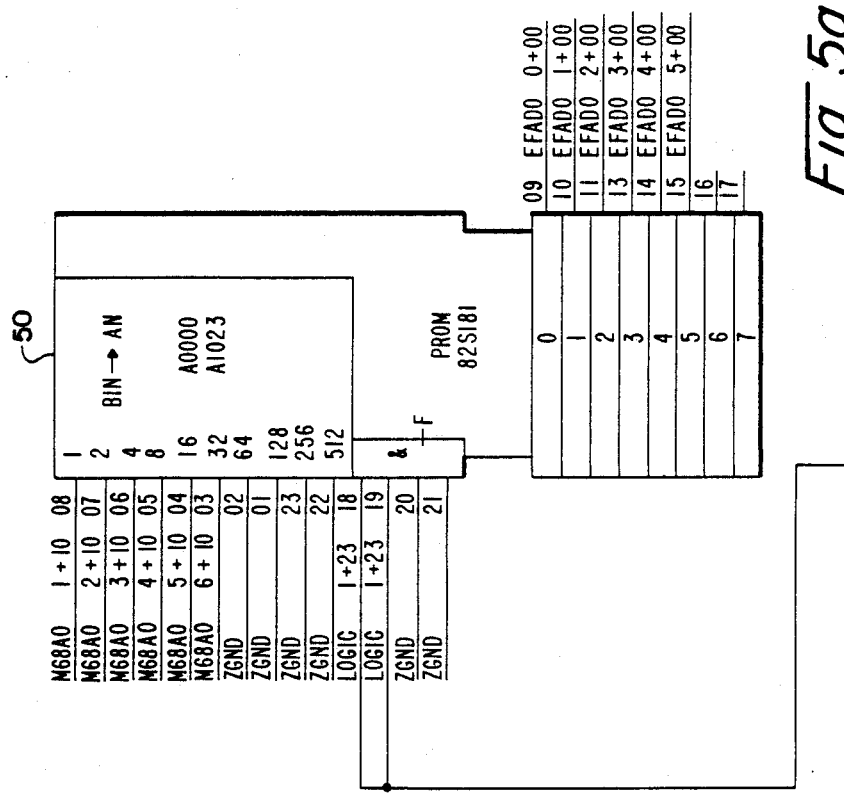
FIG. 5a and b is a schematic diagram of the translator for use in the error logging subsystem.

Referring now also to FIG. 5, translator PROM 50 and associated circuitry are shown in greater detail. In particular, an EFR control programmable array logic chip 72 generates control input signals for EFRs 24 (FIG. 2). Translator PROM 50 translates addresses from microprocessor 40 to appropriate addresses for EFRs 24. Flip flops along with the AND gate select which EFR 24 is gathering data and which EFR is accessible by microprocessor 40.

Two categories of DRAM 10 failures must be isolated. The first and most obvious is the hard error. If a memory cell, not shown, is stuck in one state, it is inoperative and the DRAM containing the cell should be replaced. The second category of failures is a DRAM which experiences an abnormal sensitivity to soft errors. A DRAM which exhibits this condition is a system hazard for two reasons: first, two DRAMs failing in the same word read from memory results in an uncorrectable error and a DRAM having a high frequency of soft errors increases the chance of such occurrence; second, a DRAM exhibiting this condition is degenerating and is likely to begin exhibiting hard errors.

In DRAMs 10, normal soft errors are likely to occur 5 times per million operating hours. This category of failure is normal and is not considered a problem.

In operation, processor 26 reserves 16 bits of data for each DRAM 10 and for each row of DRAMs on the controller. The first time an error is found on a DRAM 10, it is recorded in EFRs 24 and transferred to a compiled error history in the processor's RAM 44 (FIG. 2). Until DRAM 10 has been completely scrubbed by alpha-scrubbing mechanism 32, no further soft errors are transferred to this error history. (Otherwise, if the failing DRAM were read 100 times before it could be scrubbed, 100 failures would be recorded when only one error occurred.) By waiting until after the error has been scrubbed, a soft error is logged only once.

After DRAM locations 10 have been scrubbed, DRAM logging is once again enabled. If another error occurs in the same DRAM location 10, an error count is incremented in the processor's RAM 44 (FIG. 2) and logging is again disabled until DRAM 10 has been scrubbed. By monitoring these counts a faulty DRAM can be discovered.

The system logs all errors in failure log 22 on any read access from memory 10, including any errors encountered during alpha scrubbing. This technique provides a way of checking the validity of memory 10 not being used. Errors even in seldom used memory locations 10 are logged when the alpha scrubbing mechanism 32 attempts to scrub them. When an error is encountered during alpha scrubbing, it is recorded in the usual manner. When errors are encountered during subsequent alpha scrubs for a DRAM 10, the error count in the processor's RAM 44 for that DRAM location 10 increments, indicating improper operation.

A typical controller consists of a memory controller mother board and from 1 to 4 attached memory pacs. Each memory pac can contain from 4 to 8 rows of DRAM chips, each row consisting of 22 DRAM chips. Thus a memory controller board can have up to 704 DRAM chips.

The present invention monitors EDAC 12. Any error detected by EDAC 12 causes an error log to be updated with the location of the DRAM responsible for the error.

Failure log 22 lists both hard and soft types of errors.

System software can use failure log 22 to bypass failed memory, as is well known in the art; and field service personnel can use failure log 22 to find and replace a failed memory pac quickly. A memory pac/board need not be replaced due to a soft error, since a memory location with a soft error may be reusable after scrubbing, thus avoiding cost to return it to the factory needlessly. Factory replacement time is reduced since the problem chips are preidentifiable, thus eliminating further testing to locate defective chips.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Appendix

For Address Translator PROM 50 and PAL device 72 logic equations

```
/******************   *************************   ********************/
/*                                                                    */
/*                      EFR ADDRESS TRANSLATOR                        */
/*                                                                    */
/*     This device is a PROM which translates the microprocessor      */
/*     address into the EFR address.  When an error is encountered    */
/*     a flag is set in the EFR at an address, derived from syndrome  */
/*     bits, which corresponds to the failing DRAM.  Since the        */
/*     syndrome bits are used to generate the address, the addresses  */
/*     corresponding to the DRAM's do not follow a logical sequence.  */
/*     The translation is done such that when the microprocessor      */
/*     reads the EFR the DRAM's are sorted in a logical order.        */
/*                                                                    */
/*                                                                    */
/*********************************************************************/
/*   Allowable Target Device Types:   82S181 - RA10P8                 */
/*********************************************************************/

/**  Inputs  **/
```

```
Pins 3 - 8   = M68A06+10,M68A05+10,M68A04+10,M68A03+10,M68A02+10,M68A01+10;
                                                            /* 68000 address */
Pin 18       = LOGIC1+23 ;      /* Output Enable 4     */
Pin 19       = LOGIC1+23 ;      /* Output Enable 3     */
Pin 20       = ZGND      ;      /* Output Enable 2     */
Pin 21       = ZGND      ;      /* Output Enable 1     */

/** Outputs **/

Pins 15,14,13 = EFAD05+00,EFAD04+00,EFAD03+00 ;  /* EFR address lines 5-3 */
Pins 11,10,9  = EFAD02+00,EFAD01+00,EFAD00+00 ;  /* EFR address lines 2-0 */

/** Declarations and Intermediate Variable Definitions **/

Field input  = M68A06+10,M68A05+10,M68A04+10,M68A03+10,M68A02+10,M68A01+10;
Field output = EFAD05+00,EFAD04+00,EFAD03+00,EFAD02+00,EFAD01+00,EFAD00+00;

/** Logic Equations **/

Table   input => output

00 => 0E;       01 => 0B;       02 => 13;       03 => 15;
            04 => 16;       05 => 19;       06 => 1A;       07 => 1C;
            08 => 23;       09 => 25;       0A => 26;       0B => 29;
            0C => 2A;       0D => 2C;       0E => 31;       0F => 34;
            10 => 01;       11 => 02;       12 => 04;       13 => 08;
            14 => 10;       15 => 20;       16 => 30;       17 => 28;
            18 => 18;       19 => 38;       1A => 24;       1B => 14;
            1C => 0C;       1D => 3C;       1E => 22;       1F => 12;
            20 => 32;       21 => 0A;       22 => 3A;       23 => 06;
            24 => 36;       25 => 2E;       26 => 1E;       27 => 3E;
            28 => 21;       29 => 11;       2A => 09;       2B => 39;
            2C => 05;       2D => 35;       2E => 0D;       2F => 2D;
            30 => 1D;       31 => 3D;       32 => 03;       33 => 33;
            34 => 2B;       35 => 1B;       36 => 3B;       37 => 07;
            38 => 27;       39 => 17;       3A => 37;       3B => 0F;
            3C => 2F;       3D => 1F;       3E => 3F;       3F => 00;

/*******************   ************************    ***************/
/*                                                                */
/*                      EFR CONTROLLER                            */
/*                                                                */
/*      PAL to generate signals to control Error Flag Rams.       */
/*                                                                */
/******************************************************************/
/* Allowable Target Device Types:  PAL16L8                        */
/******************************************************************/

/** Inputs **/

Pins 2,3 = EF1GAT+20,EF2GAT+20 ; /* EFR 1 GAThering, EFR 2 GAThering */
Pins 4,5 = M68RWN-10,EFRSEL-00 ; /* 68000 R/W, 68000 Read EFR signal */
Pin  6   = LATDIN-00 ;           /* EDAC OE Byte enable timing signal */
                                 /*    - provides EFR CS             */
Pins 7,8 = SOMERO-00,SOMERE-00 ; /* EDAC error signals, odd & even   */

/** Outputs **/

Pins 12,13 = EFCS1O-00,EFWE1O-00 ; /* EFR1 Odd CS and WE  */
Pins 14,15 = EFCS1E-00,EFWE1E-00 ; /* EFR1 Even CS and WE */
Pins 16,17 = EFCS2O-00,EFWE2O-00 ; /* EFR2 Odd CS and WE  */
Pins 18,19 = EFCS2E-00,EFWE2E-00 ; /* EFR2 Even CS and WE */

/* Logic Equations */

!EFCS1O-00 =                            /* Chip select for Odd 1 EFR
```

```
  !EF1GAT+20 & !EFRSEL-00           /* EFR1 isn't Gathering & uP selects
EF1GAT+20 & !LATDIN-00 & !SOMERO-00; /* EFR1 is Gathering & error occurs !EFWE1O-00 =                        /* Write Enable for Odd 1 EFR        */
   EF1GAT+20                        /* Write mode when EFR1 is Gathering */
# !EF1GAT+20 & !M68RWN-10;          /* EFR1 not Gath. - follow M68RWN-10 */

!EFCS1E-00 =                        /* Chip select for Even 1 EFR
   !EF1GAT+20 & !EFRSEL-00          /* EFR1 isn't Gathering & uP selects
EF1GAT+20 & !LATDIN-00 & !SOMERE-00; /* EFR1 is Gathering & error occurs !EFWE1E-00 =                        /* Write Enable for Even 1 EFR       */
   EF1GAT+20                        /* Write mode when EFR1 is Gathering */
# !EF1GAT+20 & !M68RWN-10;          /* EFR1 not Gath. - follow M68RWN-10 */

!EFCS2O-00 =                        /* Chip select for Odd 2 EFR
   !EF2GAT+20 & !EFRSEL-00          /* EFR2 isn't Gathering & uP selects
EF2GAT+20 & !LATDIN-00 & !SOMERO-00; /* EFR2 is Gathering & error occurs !EFWE2O-00 =                        /* Write Enable for Odd 2 EFR        */
   EF2GAT+20                        /* Write mode when EFR2 is Gathering */
# !EF2GAT+20 & !M68RWN-10;          /* EFR2 not Gath. - follow M68RWN-10 */

!EFCS2E-00 =                        /* Chip select for Even 2 EFR
   !EF2GAT+20 & !EFRSEL-00          /* EFR2 isn't Gathering & uP selects
EF2GAT+20 & !LATDIN-00 & !SOMERE-00; /* EFR2 is Gathering & error occurs !EFWE2E-00 =                        /* Write Enable for Even 2 EFR       */
   EF2GAT+20                        /* Write mode when EFR2 is Gathering */
# !EF2GAT+20 & !M68RWN-10;          /* EFR2 not Gath. - follow M68RWN-10 */
```

Logic Equation Symbols

```
# = OR
& = AND
! = INVERT
```

Signal Definitions

EF1GAT+20 & EF2GAT+20:
    If EF1GAT+20 is high then EFR 1 is gathering any errors that
occur in memory chips 10. If EF2GAT+20 is high then EFR 2 is
gathering any errors that occur in memory chips 10. The
microprocessor has access to the EFR that is not gathering
errors.

M68RWN-10 & EFRSEL-00:
    M68RWN-10 is the MC68000 R/W* signal. EFRSEL-00 when low
along with M68RWN-10 indicates whether the MC68000 wishes to read
from or write to an EFR.

LATDIN-00:
    When low, LATDIN-00 indicates EDAC is checking for errors.

SOMERO-00 & SOMERE-00:
    When either of these signals is low an error has been
detected by the EDAC.

EFCS1O-00, EFCS1E-00, EFCS2O-00, EFCS2E-00:
    When any of these signals is low an EFR is selected.

EFWE1O-00, EFWE1E-00, EFWE2O-00, EFWE2E-00:
    These are the Write Enables for each of the EFR.

What is claimed is:

1. In a data processing system, a subsystem for determining the status of an error that occurred in a multi-chip memory storage means comprising:
   (a) error detecting means for detecting an error, said error detecting means receiving data and check bits associated therewith for generating syndrome bits as a function of said data and of said check bits; and
   (b) error logging means for determining the status of all detected errors operatively connected to said error detecting means for receiving said syndrome bits therefrom, said error logging means further comprising monitoring means for distinguishing between hard errors and soft errors, and scrubbing means for sequentially accessing predetermined physical locations in said multi-chip memory storage means in which errors have been detected, including incrementing address counters for logging said predetermined physical locations in said multi-chip memory storage means in which said errors have occurred.

2. The subsystem for determining the status of an error in accordance with claim 1 wherein said error logging means further comprises high speed error flag memory means operatively connected to said monitoring means for indicating that an error occurred in said multi-chip memory storage means.

3. The subsystem for determining the status of an error in accordance with claim 1 wherein said error logging means further comprises high speed error flag memory means operatively connected to said monitoring means for indicating that an error occurred in said multi-chip memory storage means.

4. The subsystem for determining the status of an error in accordance with claim 3 wherein said monitoring means comprises a microprocessor.

5. The subsystem for determining the status of an error in accordance with claim 4 wherein said scrubbing means comprises means for initiating a scrubbing operation of data stored in said multi-chip memory storage means, means for continuing such scrubbing operation, and means for detecting completion of said scrubbing operation.

6. The subsystem for determining the status of an error in accordance with claim 5 wherein said means for detecting completion of said scrubbing operation logs status of said predetermined multi-chip memory storage means physical location of said error.

7. The subsystem for determining the status of an error in accordance with claim 6 further comprising comparator means for determining a subsequent error in said physical location, whereby, if said subsequent error is detected, said physical location is considered defective.

8. A method for determining whether an error that occurs in a multi-chip memory subsystem having a plurality of physical storage locations in a data processing system is a repeating error in order to assess imminent storage location failures, the steps comprising:
   (a) reading data and check bits associated therewith from a predetermined physical storage location;
   (b) generating syndrome bits as a function of said data and check bits;
   (c) analyzing said syndrome bits to determine if an error occurred;
   (d) logging said predetermined physical storage location associated with an error, if detected, and counting how many times an error occurs in a particular storage location in order to assess imminent storage location failures; and
   (e) scrubbing a plurality of physical storage locations.

9. The method for determining whether an error is a hard error in accordance with claim 8, wherein said scrubbing step (e) comprises the steps of:
   (i) initiating a scrubbing operation;
   (ii) continuing said scrubbing operation; and
   (iii) detecting completion of said scrubbing operation.

10. The method for determining whether an error is a hard error in accordance with claim 9 wherein said scrubbing operation comprises sequentially accessing physical storage locations, reading data therefrom and writing data thereto.

11. The method for determining whether an error is an hard error in accordance with claim 8 wherein said logging step (d) comprises storing data in high speed error flag memory means.

12. The method for determining whether an error is an hard error in accordance with claim 11, the steps further comprising:
   (g) comparing status of the history of errors in said predetermined physical storage location with said current error to determine whether said predetermined physical memory location is defective.

* * * * *